(12) United States Patent
Nakamura et al.

(10) Patent No.: US 10,222,127 B2
(45) Date of Patent: Mar. 5, 2019

(54) FALLING FILM HEAT EXCHANGER, ABSORPTION REFRIGERATOR SYSTEM, SHIP, OFFSHORE STRUCTURE AND UNDERWATER OFFSHORE STRUCTURE

(75) Inventors: Takuju Nakamura, Tokyo (JP); Masaki Kawase, Tokyo (JP)

(73) Assignee: MODEC, INC., Tokyo (JP)

( * ) Notice: Subject to any disclaimer, the term of this patent is extended or adjusted under 35 U.S.C. 154(b) by 614 days.

(21) Appl. No.: 14/234,574

(22) PCT Filed: Aug. 16, 2012

(86) PCT No.: PCT/JP2012/070804
§ 371 (c)(1),
(2), (4) Date: Mar. 12, 2014

(87) PCT Pub. No.: WO2013/035509
PCT Pub. Date: Mar. 14, 2013

(65) Prior Publication Data
US 2014/0231058 A1 Aug. 21, 2014

(30) Foreign Application Priority Data
Sep. 9, 2011 (JP) ................................. 2011-197237

(51) Int. Cl.
*F28D 3/04* (2006.01)
*F28D 5/02* (2006.01)
(Continued)

(52) U.S. Cl.
CPC ................ *F28D 3/04* (2013.01); *F28D 3/02* (2013.01); *F28D 5/02* (2013.01); *F28F 9/22* (2013.01);
(Continued)

(58) Field of Classification Search
CPC ...... F28D 3/02; F28D 3/04; F28D 5/02; F28F 9/22; F28F 2009/226; F28F 2009/224
(Continued)

(56) References Cited

U.S. PATENT DOCUMENTS 33,967 A * 12/1861 Trageser ................... F28D 5/02
165/115
1,428,159 A 9/1922 Gallsworthy
(Continued)

FOREIGN PATENT DOCUMENTS

CN 1159560 A 9/1997
CN 1185203 A 6/1998
(Continued)

OTHER PUBLICATIONS

Canadian Office Action dated Mar. 27, 2015, issued in corresponding CA Patent Application No. 2,843,689 (3 pages).
(Continued)

Primary Examiner — Devon Russell
(74) Attorney, Agent, or Firm — Westerman, Hattori, Daniels & Adrian, LLP

(57) ABSTRACT

A guide plate having depressed portions is provided between an array of heat exchanger tubes, herein after "tubes", arranged horizontally side-by-side and a next lower array of tubes arranged horizontally side-by-side, and is positioned with the lowest parts of the depressed portions near crest portions of respective lower tubes. The guide plate conveys a liquid D on outer surfaces of respective upper tubes onto similarly positioned lower tubes even when the tubes move in a right-and-left direction. A falling film heat exchanger installed in a ship, an offshore structure or the like can avoid reduction in heat exchange performance, even when the ship or the like inclines and swings, by substantially evenly distributing and dropping a liquid onto the crests of the tubes (Continued)

and causing the liquid dropped from the tubes located in an upper array to fall onto the tubes located in the next lower array.

13 Claims, 11 Drawing Sheets

(51) Int. Cl.
| | |
|---|---|
| F28F 9/22 | (2006.01) |
| F28D 3/02 | (2006.01) |
| F25B 37/00 | (2006.01) |
| F25B 39/02 | (2006.01) |
| B63J 2/12 | (2006.01) |
| B63G 8/36 | (2006.01) |
| B63H 21/38 | (2006.01) |
| F28D 7/16 | (2006.01) |
| F28D 21/00 | (2006.01) |

(52) U.S. Cl.
CPC ............. *B63G 8/36* (2013.01); *B63H 21/383* (2013.01); *B63J 2/12* (2013.01); *F25B 37/00* (2013.01); *F25B 39/026* (2013.01); *F28D 7/16* (2013.01); *F28D 2021/0071* (2013.01); *F28F 2265/00* (2013.01); *Y02A 30/277* (2018.01); *Y02A 30/278* (2018.01); *Y02B 30/62* (2013.01); *Y02B 30/64* (2013.01)

(58) Field of Classification Search
USPC .................................................. 165/111, 117
See application file for complete search history.

(56) References Cited

U.S. PATENT DOCUMENTS

| | | | | | |
|---|---|---|---|---|---|
| 2,729,952 | A | * | 1/1956 | Whitlow | F25B 15/06 165/108 |
| 3,990,263 | A | * | 11/1976 | Ainbinder | F25B 37/00 62/476 |
| 4,651,819 | A | * | 3/1987 | Yumikura | B01D 1/12 165/115 |
| 4,784,528 | A | * | 11/1988 | Spalding | E02D 27/52 405/195.1 |
| 5,561,987 | A | * | 10/1996 | Hartfield | B01D 1/04 165/117 |
| 5,588,596 | A | * | 12/1996 | Hartfield | B01D 1/04 165/117 |
| 5,942,164 | A | * | 8/1999 | Tran | B01D 3/20 165/60 |
| 6,253,571 | B1 | * | 7/2001 | Fujii | F25B 15/008 62/484 |
| 9,314,802 | B2 | * | 4/2016 | Okumura | B05B 1/265 |
| 2006/0156750 | A1 | * | 7/2006 | Lowenstein | F24F 3/1417 62/271 |
| 2007/0199204 | A1 | * | 8/2007 | Knight | H05K 7/1425 34/428 |
| 2008/0149311 | A1 | * | 6/2008 | Liu | F25B 39/028 165/115 |
| 2008/0221367 | A1 | * | 9/2008 | Hollander | B01F 3/04248 568/571 |
| 2009/0049861 | A1 | | 2/2009 | Luo et al. | |
| 2009/0178790 | A1 | | 7/2009 | Schreiber et al. | |
| 2011/0056664 | A1 | * | 3/2011 | De Larminat | F25B 39/028 165/160 |
| 2011/0120685 | A1 | | 5/2011 | Van Heeswijk et al. | |

FOREIGN PATENT DOCUMENTS

| | | | | |
|---|---|---|---|---|
| CN | 201203306 | Y | | 3/2009 |
| CN | 101636630 | A | | 1/2010 |
| CN | 202304118 | U | | 7/2012 |
| EP | 0 752 567 | A1 | | 1/1997 |
| ES | 2 123 327 | T3 | | 1/1999 |
| JP | 59-172964 | U | | 11/1984 |
| JP | 61-153390 | | | 7/1986 |
| JP | 09-079692 | A | | 3/1997 |
| JP | 11-108501 | A | | 4/1999 |
| JP | 2000-179989 | A | | 6/2000 |
| JP | 2002-090000 | A | | 3/2002 |
| JP | 2002-228380 | A | | 8/2002 |
| JP | 2005003296 | A | * | 1/2005 ............... F28D 3/04 |
| JP | 2005-207620 | A | | 8/2005 |
| JP | 2011-80756 | A | | 4/2011 |
| WO | 98/41798 | A1 | | 9/1998 |
| WO | 2009/026370 | A2 | | 2/2009 |

OTHER PUBLICATIONS

International Search Report dated Nov. 20, 2012 issued in corresponding application No. PCT/JP2012/070804.
European Search Report dated Mar. 19, 2015, issued in counterpart application No. 12830181.9 (5 pages).
Office Action dated Jun. 3, 2015, issued in counterpart Chinese application No. 201280043792 (w/English translation) (8 pages).
Search Report dated May 25, 2015 issued in counterpart Chinese application No. 201280043792X (2 pages).

* cited by examiner

FALLING FILM HEAT EXCHANGER, ABSORPTION REFRIGERATOR SYSTEM, SHIP, OFFSHORE STRUCTURE AND UNDERWATER OFFSHORE STRUCTURE

TECHNICAL FIELD

The present invention relates to a falling film heat exchanger and an absorption refrigerator system which are usable in a ship, an offshore structure, underwater equipment and the like inherently involving swing motions, and also relates to a ship, an offshore structure and an underwater offshore structure equipped with the same.

BACKGROUND ART

Among technologies widely used for cooling of chilled water for air cooling and the like, there are a falling film heat exchanger and an absorption refrigeration system using this heat exchanger. This falling film heat exchanger is a heat exchanger provided with a tube bank formed of numerous heat exchanger tubes, through each of which a first fluid (liquid or gas) flows, arranged not only in a horizontal direction and but also in a vertical direction. A second fluid (liquid) is dropped or spayed, for example, to flow down onto the outer surfaces of the heat exchanger tubes in the uppermost array, so that the outer surfaces of the heat exchanger tubes are covered with the second fluid. Thereby, the first fluid and the second fluid are caused to exchange heat. Then, the second fluid covering the outer surfaces of the heat exchanger tubes in that array is caused to flow down to the heat exchanger tubes in the next array below these heat exchanger tubes. Thus, through the heat exchanger tubes in the next array, the first fluid and the second fluid exchange heat. In this way, the heat exchanger causes the first fluid and the second fluid to exchange heat through the heat exchanger tubes in the lower arrays sequentially one after another.

This falling film heat exchanger can perform efficient heat exchange because the heat exchanger can achieve a great leap in the heat exchange amount by use of the heat of vaporization of the second fluid. For this reason, such falling film heat exchangers are widely used for evaporators, absorbers, regenerators and the like of absorption refrigeration systems.

Meanwhile, an absorption refrigeration system described in International Patent Application Publication No. WO98/41798, for example, uses the second fluid as a coolant in an evaporator, and is configured to promote evaporation of the coolant in a way that the coolant is caused to flow down onto the outer surfaces of heat exchanger tubes in a closed vessel, and to exchange heat with the first fluid in the heat exchanger tubes in the process of flowing down, thereby generating a gas of the coolant; and the gas is absorbed by an absorbing liquid in an absorber communicating with the closed vessel. For the promotion of the evaporation of the coolant, it is important to distribute the coolant forming a falling film evenly over the entire length of each of the heat exchanger tubes, and to surely distribute the coolant over the bank of heat exchanger tubes.

To this end, it is necessary to devise a method of distributing and dropping the coolant or the absorber onto the heat exchanger tubes in the uppermost array as evenly as possible, and to also space out the heat exchanger tubes at certain intervals. In addition, in the case where the heat exchanger tubes arranged to extend horizontally are used, the configuration of a liquid distributor is especially important because the liquid dropped down from the heat exchange tubes in an upper position need to be surely dropped onto the heat exchange tubes in a lower position. As such a liquid distributor, a dropping device made of a single plate and being usable as a dropping device for an absorption refrigerator has been proposed as described in Japanese Patent Application Publication No. 2005-207620, for example.

Moreover, as described in Japanese Patent Application Publication No. Hei 11-108501, for example, an evaporator for an absorption refrigerator has been proposed in order to improve heat exchange performance by preventing an increase in a dried portion where no coolant liquid flows down on the surfaces of heat exchanger tubes. The evaporator is provided with spacers arranged at predetermined intervals in a vertical direction, located between upper and lower neighboring heat exchanger tubes and extended in a longitudinal direction of the heat exchanger tubes, and is configured to form liquid pools around joint portions between the spacers and the lower heat exchanger tubes.

However, this falling film heat exchanger and an absorption refrigeration system using this heat exchanger have drawback in that the exchanger can hardly tolerate an inclination with respect to the horizontal plane and a swing motion because the performance is remarkably deteriorated unless the coolant or absorber is dropped while being distributed evenly over the heat exchanger tubes in the uppermost array, or unless the liquid flowing down from each heat exchanger tube in the upper position surely flows down onto the surface of the heat exchanger tube in the lower position and covers the entire surface with its liquid film. This drawback becomes more serious if the falling film heat exchanger inclines. Hence, there arises a problem that this falling film heat exchanger and the absorption refrigeration system using this heat exchanger are not installable in a ship, an offshore structure, or an underwater offshore structure which inherently involves an inclination and a swing motion.

In short, in connection with the inclination of the falling film heat exchanger, there are a bypass problem, a no-flow region increase problem and a wet surface reduction problem. The bypass problem is a problem that the second fluid passes through between the heat exchanger tubes in the first next lower array, and flows down to the heat exchanger tubes in the second next lower array.

As illustrated in FIG. 13, in the case of a falling film heat exchanger employing a configuration in which heat exchanger tubes 21 are aligned in a staggered arrangement, a second fluid D is dropped toward the center lines (tube axes) of the heat exchanger tubes 21 in the uppermost array when the falling film heat exchanger is not inclined in a cross-sectional plane of the heat exchanger tubes 21. In this case, however, the dropping second fluid D may bypass the heat exchanger tubes 21 in the even-numbered arrays from the top by passing without contacting the heat exchanger tubes 21.

In the case of water, it is said that a volume of 20 droplets is about 1 cc and a natural droplet diameter of the second fluid D is only about 2 mm. For this reason, this problem cannot be avoided unless the heat exchanger tubes 21 are arranged at lateral intervals S of 2 mm or smaller. Nevertheless, it is difficult to make the lateral intervals be 2 mm or smaller in view of process working of a tube sheet (tube wall) and strength.

Instead, as illustrated in FIG. 14, in a case of employing a non-staggered arrangement, this bypass problem does not occur unless an inclination at about 20 degrees occurs.

However, as illustrated in FIG. 15, once the inclination occurs at an inclination angle exceeding about 20 degrees, the bypass problem also occurs as in the case of the staggered arrangement, and the heat exchange area is reduced by as much as 50% only due to the bypassing.

Next, the no-flow region increase problem is a problem that a region of the heat exchanger tubes 21 where the second fluid D does not flow, in short, a no-flow region occurs due to a sideways inclination of the apparatus. If the exchanger inclines largely, there are some heat exchanger tubes 21 (hatched heat exchanger tubes) onto which the second fluid D does not flow down, as illustrated in FIG. 16. In the case of employing the non-staggered arrangement as illustrated in FIG. 16, this phenomenon does not occur unless the inclination of the apparatus reaches an inclination at about 20 degrees. However, once this phenomenon occurs, the heat exchange area is reduced as illustrated in FIG. 16, and about 50% of the total region is a no-flow region in the case of FIG. 16. On the other hand, in the case of employing the staggered arrangement as illustrated in FIG. 17, even a slight inclination influences about 20% of the heat exchange area in the case of FIG. 17. Nevertheless, even if the inclination angle increases, the influence more than that does not occur unless the inclination angle reaches about 40 degrees. Although FIGS. 16 and 17 illustrate the cases where the heat exchanger tube bank includes the same number of heat exchanger tubes arranged in the vertical direction and in the lateral direction, the no-flow region increase problem occurs more notably if the number of tubes arranged in the vertical direction is larger than that in the lateral direction.

Then, the wet surface reduction problem is a problem that the liquid film does not cover the entire surface of a heat exchanger tube 21 but covers only a part of the surface. If each heat exchanger tube 21 receives a droplet at a position thereof in the plumb line (from right above), the liquid film Ds is formed on both the right and left sides of the heat exchanger tube 21 as illustrated in FIG. 18. However, if the droplet is slightly displaced, the liquid film Ds is formed on only one side as illustrated in FIG. 19. In the case illustrated in FIG. 19, the liquid film Ds is reduced to about 35% whereas about 65% of the total is not covered with the liquid film Ds. If the droplet grazes the heat exchanger tube 12 very slightly, in particular, the liquid film Ds is reduced to about 25% of the total whereas about 75% of the total is not covered with the liquid film Ds. In the case of the staggered arrangement, this problem especially occurs even if the inclination is not large.

Hence, if the inclination of the apparatus is about 20 degrees or smaller, and if the interval between the heat exchanger tubes 21 has a certain distance, it can be said that the non-staggered arrangement can easily avoid the bypass problem and the no-flow region increase problem. In the case of the non-staggered arrangement, however, it is considered that, due to the wet surface reduction problem, the apparatus can exert only 50% or less of its full performance with a somewhat large inclination large, or only about 35% thereof with an inclination at about 20 degrees.

On the other hand, in the case of the staggered arrangement, it is important to arrange the heat exchanger tubes at horizontal intervals of about 2 mm or less in order to prevent a phenomenon in which the bypass problem occurs in the even-numbered arrays even when the inclination is not large. Even if such spacing is realized, it is considered that, due to a reduction in the heat exchange area due to the no-flow region increase problem and a reduction in the heat exchange area due to the wet surface reduction problem, the apparatus can exert only about 30% of the full performance if the heat exchanger tube bank includes the same number of heat exchanger tubes arranged in the vertical direction and in the lateral direction, or exert much poorer performance if the number of tubes arranged in the vertical direction is larger than that in the lateral direction.

PRIOR ART DOCUMENT

Patent Document

Patent Document 1: International Patent Application Publication No. WO98/41798
Patent Document 2: Japanese Patent Application Publication No. 2005-207620
Patent Document 3: Japanese Patent Application Publication No. Hei 11-108501

SUMMARY OF THE INVENTION

Problem to be Solved by the Invention

The present invention has been made in view of the foregoing circumstances, and has an objective to provide a falling film heat exchanger and an absorption refrigeration system which are each installed in a ship, an offshore structure, an underwater offshore structure or the like, and can avoid reduction in heat exchange performance, even when the ship or the like inclines or swings, by substantially evenly distributing and dropping a liquid such as a coolant or absorber onto the crests of the heat exchanger tubes and causing the liquid dropped from the heat exchanger tubes located in an upper array to surely fall onto the heat exchanger tubes located in a next lower array, and also to provide a ship, an offshore structure and an underwater offshore structure.

In short, the objective of the present invention is to provide a falling film heat exchanger and an absorption refrigeration system which are each installable in a ship, an offshore structure, an underwater offshore structure, or the like, and to provide a ship, an offshore structure and an underwater offshore structure equipped with any of them.

Moreover, another objective of the present invention is to provide a falling film heat exchanger and an absorption refrigeration system involving neither size-increase nor increase in high-end components needing maintenance, as compared with usual ones installed on land.

Means for Solving the Problem

In order to achieve the foregoing objectives, a falling film heat exchanger of the present invention includes heat exchanger tubes each arranged substantially horizontally, and is configured such that: a plurality of heat exchanger tubes are aligned in arrays spaced in a vertical direction; a guide plate having depressed portions is provided between an array of heat exchanger tubes arranged side by side in a horizontal direction and a next lower array of heat exchanger tubes arranged side by side in the horizontal direction, and is positioned with lowest parts of the depressed portions disposed near crest portions of the respective lower heat exchanger tubes, the lowest parts of the depressed portions of the guide plate are provided with flow-down holes for allowing liquid droplets to flow down onto the crests of the heat exchanger tubes; and thereby the guide plate is configured to convey the liquid flowing down on outer surfaces of the respective upper heat exchanger tubes onto the lower heat exchanger tubes having one-to-one correspondences to the upper heat exchanger tubes even when an inclination within a predetermined angle range set in advance occurs in a plane perpendicular to tube axes of the heat exchanger tubes. With this configuration, the liquid can be surely dropped onto the crests of the heat exchanger tubes in the next lower array.

In the above falling film heat exchanger, the lowest parts of the depressed portions of the guide plate are each formed in a left-right symmetrical shape. This configuration enables the entire surfaces of the lower heat exchanger tubes to be covered with liquid films by causing the liquid to flow down evenly onto the right and left sides of the crest portion of the lower heat exchanger tubes in the cross sectional plane thereof.

In the above falling film heat exchanger, the guide plate is formed of a folded or corrugated plate. The guide plate with this configuration is very easy to produce.

In the above falling film heat exchanger, the guide plate is formed of any plate material selected from a mesh sheet, a grating, a grid, and a louvered sheet in which small holes are opened with a diameter smaller than a natural droplet diameter of the liquid to be dropped. The guide plate with this configuration can be produced very easily by processing an existing commercially available product only with small work.

In the above falling film heat exchanger, the guide plate is provided with a louver or a relief structure having a ridge substantially perpendicular to a valley line of each of the depressed portions of the guide plate so as to prevent the dropped liquid from moving, over the guide plate, along the valley line of the depressed portion of the guide plate. This relief structure is formed by embossing or wrinkle processing. In this configuration, the relief structure can prevent the liquid from flowing along the valley fold line, and thereby the liquid can be dropped evenly in the longitudinal direction of the heat exchanger tubes.

In the above falling film heat exchanger, the flow-down holes are formed in right and left sides of the lowest part of each of the depressed portions by making cuts in any shape selected from a half circle, a U shape, a V shape, a block-U shape, a nail shape, and a nail shape with crack tip, each of which has both endpoints located on almost the center line of the lowest part, and then by making a valley fold at the lowest part while causing protrusions formed by the cuts to jut downward from the depressed portion, and the protrusion of an inclined surface to the left of a valley fold line of the lowest part is configured to forma slope continuously extended to the right beyond the valley fold line, and the protrusion of an inclined surface to the right of the valley fold line is configured to form a slope continuously extended to the left beyond the valley fold line. If burrs are generated in the cut-out surfaces of the cuts, the burrs are left sticking out on the upper side on the depressed portion. The burrs in the cut-out surfaces of the cuts are warpage generated when the cuts are made by punching or the like, and are also called flashes.

With this configuration, even when the heat exchanger inclines in the right-left direction of the heat exchanger tubes, the protrusions (tongues) formed by the cuts serve as guides to the crest portions in the plumb lines of the heat exchanger tubes in the lower array, and the burrs guide the liquid to the protrusions (tongues) while preventing the liquid from falling into the holes formed by the cuts before the liquid reaches the valley fold line. Thus, even when an inclination occurs, the liquid can be dropped evenly on the right and left sides of each heat exchanger tube in the lower array.

In the above falling film heat exchanger, the depressed portions of the guide plate are in contact with the crest portions of the lower heat exchanger tubes. This configuration enables the liquid to surely flow down onto the lower heat exchanger tubes from the upper heat exchanger tubes, respectively, and moreover enables the entire surfaces of the lower heat exchanger tubes with liquid films in the cross sectional plane thereof. In addition, since heat conduction occurs between the guide plate and the heat exchanger tubes, the guide plate can also function as a heat dissipater or absorber fin provided to the heat exchanger tubes. Incidentally, if the guide plate and the heat exchanger tubes are made of different kinds of metals and therefore corrosion due to a potential difference needs to be prevented, an insulating heat dissipater sheet made of, for example, a silicon material filled with a ceramic filler or any other material may be inserted between the guide plate and the heat exchanger tubes.

In addition, an absorption refrigeration system of the present invention for achieving the foregoing objectives includes the above falling film heat exchanger. This configuration allows the absorption refrigeration system to produce the similar or same effects as those of the above falling film heat exchanger.

Further, a ship of the present invention for achieving the foregoing objectives is equipped with the above falling film heat exchanger or the above absorption refrigeration system. This configuration allows the ship to produce the similar or same effects as those of the above falling film heat exchanger. Moreover, if the above falling film heat exchanger or the above absorption refrigeration system is installed such that the axial direction of the heat exchanger tubes is almost-exactly aligned with the ship longitudinal direction (the fore-and-aft direction of the hull, i.e., roll axis direction), the influence by a sideways inclination (heel) and a sideways swing (roll) can be made small.

Furthermore, an offshore structure and an underwater offshore structure ship of the present invention for achieving the foregoing objectives are equipped with the above falling film heat exchanger or the above absorption refrigeration system. Here, if the offshore structure or the underwater offshore structure has a ship-like shape, preferable installation is such that the axial direction of the heat exchanger tubes is substantially-exactly aligned with the ship longitudinal direction (the fore-and-aft direction of the hull, i.e., roll axis direction). This configuration can produce the similar or same effects as those of the above falling film heat exchanger, the above absorption refrigeration system, and the above ship.

Here, the ship is a structure sailing on the sea with propulsion means, and the offshore structure is a structure on the sea without having driving means. In addition, the underwater offshore structure is a structure, such as an underwater sailing body, a submarine and an underwater base, which is capable of sailing underwater or which is used under water.

Effects of the Invention

As has been described above, according to the falling film heat exchanger and the absorption refrigerator system as well as the ship, the offshore structure and the underwater offshore structure in the present invention, even when the ship or the like inclines or swings, the guide plates in the falling film heat exchanger surely drop a liquid onto the crests of heat exchanger tubes, thereby enable the liquid dropped from the heat exchanger tubes located in the upper array to surely fall on the surfaces of the heat exchanger tubes located in the lower arrays, and thereby can avoid the reduction in heat exchange performance.

MODES FOR CARRYING OUT THE INVENTION

Hereinafter, description is provided for a falling film heat exchanger and an absorption refrigerator system, as well as a ship, an offshore structure, and an underwater offshore structure of embodiments according to the present invention. In the description of the embodiments, a falling film heat exchanger and an absorption refrigerator system are explained as those installable on any of a ship, an offshore structure, and an underwater offshore structure (hereinafter referred to as a ship or the like), but it is not necessary to limit the present invention to a falling film heat exchanger and an absorption refrigerator system installed on a ship or the like. The present invention may include a falling film heat exchanger and an absorption refrigerator system installed on any other land-based facilities.

Here, an absorption refrigeration system in an embodiment according to the present invention includes a falling film heat exchanger 20 of the following embodiment according to the present invention, whereas a ship, an offshore structure and an underwater offshore structure of embodiments according to the present invention include a falling film heat exchanger 20 of the following embodiment according to the present invention or an absorption refrigerator of the following embodiment according to the present invention. It should be noted that the absorption refrigeration system of this embodiment is explained by taking as an example an absorption refrigerator using lithium bromide as an absorber and water as a coolant.

Figure 1:
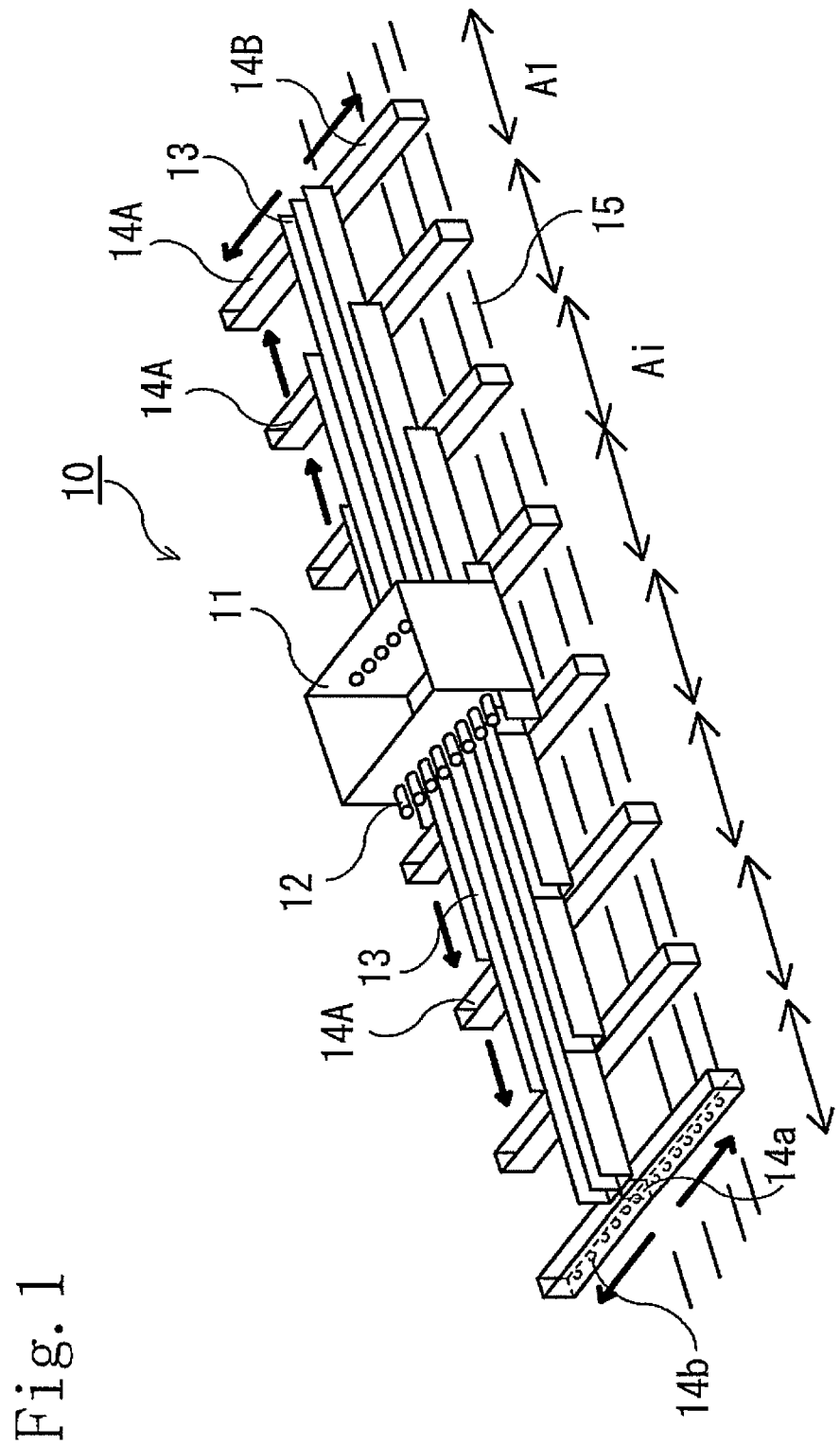
FIG. 1 is a perspective view illustrating a schematic configuration of a liquid distributor of a falling film heat exchanger of an embodiment according to the present invention.
Figure 2:
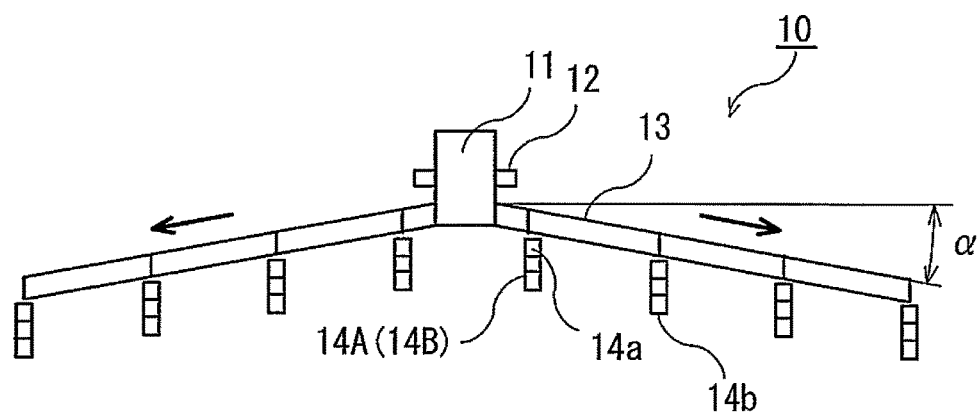
FIG. 2 is a front view illustrating the schematic configuration of the liquid distributor of the falling film heat exchanger of the embodiment according to the present invention.

The falling film heat exchanger of the embodiment according to the present invention is a falling film heat exchanger capable of withstanding a swing motion in a tube axial direction of the heat exchanger tubes and a swing motion in a plane perpendicular to the tube axes so that the heat exchanger can be installed on a ship or the like. As illustrated in FIGS. 1 and 2, the falling film heat exchanger includes a liquid distributor 10 configured to distribute a liquid D over the outer surfaces of heat exchanger tubes 21 distributed within a wide area when viewed from above.

In the case where the falling film heat exchanger is installed in a ship or the like, the falling film heat exchanger is arranged with an axial direction of the heat exchanger tubes 21 aligned with a ship longitudinal direction (fore-and-aft direction) of the ship or the like, because an angle of pitch (that is an up and down motion of the stem and stern of the ship) is smaller than an angle of roll (that is an up and down motion of the port and starboard of the ship), in general. In other words, the falling film heat exchanger is arranged such that a rotation around the tube axis of the heat exchanger tube 21 can be made in the same direction as the roll of the ship, the offshore structure, or the underwater offshore structure.

This liquid distributor 10 includes a distribution tank 11, dischargers 12, first distribution passages 13, and second distribution passages 14A, 14B. The distribution tank 11 receives and temporarily reserves a liquid to be supplied to the surfaces of the heat exchanger tubes 21. The dischargers 12 are for discharging the liquid D evenly from the distribution tank 11, and are provided in plurality with the same fluid resistance. The liquid D flowing inside the dischargers 12 is exposed to an ambient pressure inside the heat exchanger at outlets of the dischargers 12. The first distribution passages 13 receive the liquid D discharged from the dischargers 12 and discharge the liquid D to the second distribution passages 14A, 14B from their respective end portions. At least a main part of each first distribution passage 13 is arranged along a longitudinal direction of an area over which the heat exchanger tubes 21 are distributed, or instead if the area is square, in a direction of one side of the square, when viewed from above. Each first distribution passage 13 is assigned an area that is one of sub-sections obtained by dividing the above distribution area in the longitudinal direction. In addition, the first distribution passage 13 may be also assigned an area that is one of sub-sections obtained by dividing the distribution area in the short-side direction, or in the direction of another side of the square if the area is square. Here, a tip end of the first distribution passage 13 may be folded in an L shape, for example, such that the liquid may be discharged from the first distribution passage 13 to the second distribution passage 14A, 14B without overflowing.

The second distribution passages 14A, 14B are configured to receive the liquid D from the first distribution passages 13 and to guide the liquid D from many distribution holes 14a provided in their bottom portions to a tray 15 in areas Ai assigned to the second distribution passages 14A, 14B. The first distribution passages 13 and the second distribution passages 14A, 14B are each formed to be long and open on the top side and to have a cross section in a recessed shape.

The second distribution passages 14A, 14B are provided to cross the tray 15 that receives the liquid D discharged from the end portions of the first distribution passages 13 or to cross the main parts of the first distribution passages 13 when viewed from above (at right angles in this embodiments). In addition, the tray 15 or the second distribution passages 14A, 14B are provided with distribution holes 14b, so that the liquid D is distributed from the distribution holes 14b within an area assigned to each first distribution passage 13 and then is dropped onto the heat exchanger tubes 21.

For example, the first distribution passages 13 are aligned to extend in the longitudinal direction of the heat exchanger tubes 21, whereas the second distribution passages 14A, 14B are aligned to extend in a direction orthogonal to the longitudinal direction of the heat exchanger tubes 21. In other words, the first distribution passages 13 are arranged along the fore-and-aft direction of the ship or the like, and the second distribution passages 14A, 14B are arranged along the right-and-left direction of the ship or the like. Moreover, the first distribution passages 13 are each formed with a downslope in a range of 5 degrees to 45 degrees, both inclusive, where the first distribution passage 13 becomes lower toward its tip end side. In addition, each of the second distribution passages 14A, 14B may be also formed with a downslope where the second distribution passage 14A, 14B becomes lower toward its tip end side.

In the case where the falling film heat exchanger is installed on the ship or the like, the falling film heat exchanger is arranged with the longitudinal direction of the heat exchanger tubes 21 aligned with the fore-and-aft direction of the hull. In this case, if the first distribution passages 13 are arranged to extend in the longitudinal direction of the heat exchanger tubes 21, the slope only has to overcome forward and backward motions of the hull. For instance, in order to overcome a fore-and-aft inclination at 5 degrees, in total, resulting from a 2-degree hull trim (static inclination in the fore-and-aft direction) and a 3-degree pitching (dynamic rotational motion in the fore-and-aft direction), the passages are provided with the downslope at an angle larger than the fore-and-aft inclination, for example, about 8 degrees. With this setting, the necessary downslope can be secured always. In the case where the passages are formed of channel-shaped gutters, the walls of the channels need to be high enough to prevent overflow of the liquid D even under a roll (dynamic rotational motion in a sideways direction) of the hull at about 20 degrees.

If the first distribution passages 13 are provided with a downslope at an angle larger than a total inclination angle of the hull trim and the longitudinal swing (pitch) which the ship or the like is expected to have when the falling film heat exchanger is in operation, the liquid D flowing inside the first distribution passages 13 can be discharged to the second distribution passages 14A, 14B without flowing back in the reverse direction.

Moreover, the distribution tank 11 is disposed around the center in the longitudinal direction of the heat exchanger tubes 21. With this configuration, the height necessary for the downslope of the first distribution passages 13 can be made low.

In addition, the dischargers 12 are formed of stub pipes with the same shape. The structure of an outlet portion from the distribution tank 11 may be a simple opening hole. However, if the dischargers 12 are provided with discharge resistance at a certain degree, the distribution tank 11 can always keep the liquid surface thereinside higher in level than all the dischargers 12, and thereby the dischargers 12 can discharge an equal amount of liquid D. Thus, it is preferable to provide the dischargers 12 with discharge resistance at a certain degree, and also to make the dischargers 12 uniform accurately with the same level of discharge resistance. For these reasons, the dischargers 12 are preferably formed of stub pipes having the same diameter and length.

In addition, when the liquid distributor 10 and the falling film heat exchanger including the liquid distributor 10 are inclined, a liquid pressure applied to the dischargers 12 under the inclination may vary among the dischargers 12 and the discharge amounts from the dischargers 12 may vary from each other. In order to present this, the dischargers 12 are arranged at the same height level and spaced at the smallest possible horizontal intervals.

Additionally, the first distribution passages 13, the second distribution passages 14A, 14B and the like following the dischargers 12 are different from each other in flow resistance or the like due to a difference in passage length. If the dischargers 12 are formed of stub pipes, it is preferable not to form close passages communicating with the stub pipes, but to release the liquid D discharged from the stub pipes under an ambient pressure inside the heat exchanger before entering the first distribution passages 13 in order to prevent the difference in flow resistance or the like from affecting the amounts of liquid D discharged from the stub pipes.

The first distribution passages 13 are each configured to be assigned one of areas Ai into which the total region is divided in the longitudinal direction, e.g., an area A1 around the front ends of the heat exchanger tubes, or an area A2 somewhat behind the area A1.

The heat exchanger tubes 21 are also distributed widely in a cross-wise direction of the hull, the total region is also divided in the cross-wise direction into assignment areas Aij. For example, out of the first distribution passages 13 extending for the longest distance on the left side of FIG. 1, a first distribution passage 13 located in front is assigned the right half of the area around the front ends of the heat exchanger tubes 21, whereas the neighboring first distribution passage 13 located behind is assigned the left half of the area around the front ends of the heat exchanger tubes 21. In this case, the second distribution passages 14A, 14B, which are gutters for receiving the liquid D from the first distribution passages 13 and distributing the liquid D in the lateral direction are provided with a partition plate 14b by which the passages 14A, 14B are partitioned into the left half and the right half, and the first distribution passages 13 each cause the liquid D to flow into only the right section or the left section of the second distribution passages 14A, 14B.

Figure 3:
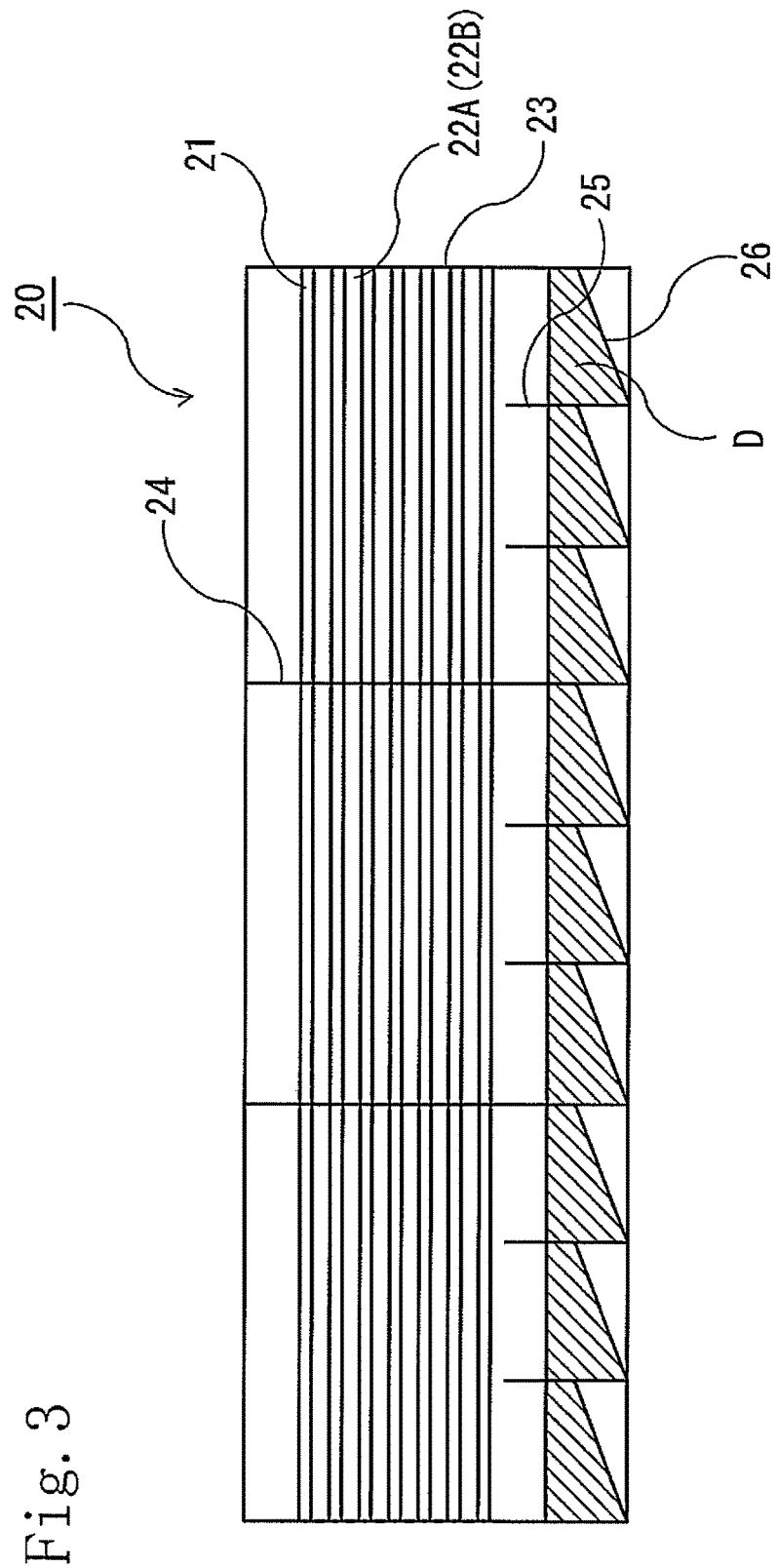
FIG. 3 is a side view illustrating the schematic configuration of a bank of heat exchanger tubes of the falling film heat exchanger of the embodiment according to the present invention.
Figure 4:
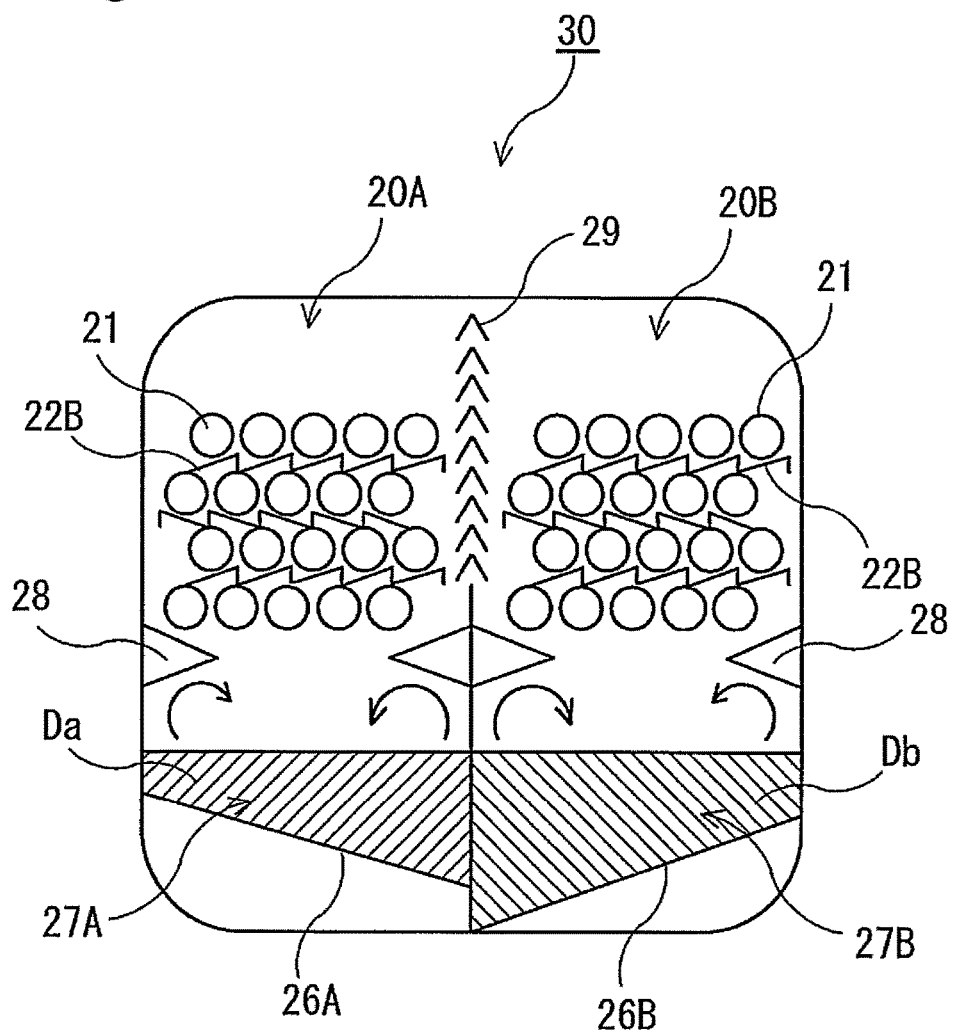
FIG. 4 is a front view illustrating schematic configurations of an evaporator (left half side) and an absorber (right half side) of an absorption refrigeration system of an embodiment according to the present invention.

FIGS. 3 and 4 are views illustrating an arrangement of the heat exchanger tubes 21 in the falling film heat exchanger 20. The heat exchanger tubes 21 are arrayed under the tray 15 of the liquid distributor 10 and are structured such that the longitudinal direction of the first distribution passages 13 of the liquid distributor 10 is parallel with the longitudinal direction of the heat exchanger tubes 21 and that the longitudinal direction of the second distribution passages 14A, 14B is aligned with the right-and-left direction of the heat exchanger tubes 21.

As illustrated in FIG. 3, in the falling film heat exchanger 20, the heat exchanger tubes 21 are held by tube sheets (tube plates) 23, 24, and arranged in parallel with each other in a horizontal direction and in a vertical direction. Moreover, as for upper and lower neighboring arrays of heat exchanger tubes 21, a guide plate 22A (or 22B) is arranged between the upper array of the heat exchanger tubes 21 and the lower array of the heat exchanger tubes 21.

Moreover, as illustrated in FIGS. 3 and 4, the bottom section of the falling film heat exchanger 20 collects the liquid D and is provided with partition plates 25, illustrated in FIG. 3, for preventing wild fluctuation of a liquid surface to avoid sloshing. In addition, in order to collect the liquid D without causing liquid breaks even under swing motions, it is preferable that each bottom portion 26 be inclined at an angle larger than an expected inclination angle and be provided with outlets (not illustrated) at its lowest part. The inclination angles are set in consideration of the sum of the fore-and-aft inclination (trim) and the fore-and-aft swing (pitch) in FIG. 3, and in consideration of the sum of the sideways inclination (heel) and the sideways swing (roll) in FIG. 4.

Further, in the absorption refrigerator 30, a falling film heat exchanger 20A to function as an evaporator and a falling film heat exchanger 20B to function as an absorber may be provided integrally with each other, as illustrated in FIG. 4, for example. In this case, for the purpose of preventing two different liquids Da and Db in bottom portions 26A, 26B from mixing with each other, it is desirable to provide parapets 28 to liquid reservoirs 27A, 27B, respectively, and to provide a coolant-absorber separation louver 29 in an upper border portion between the evaporator and the absorber.

Next, with reference to FIGS. 3 to 11, description is provided below for the guide plate 22A, 22B, which is one of the features of the present invention, provided between upper and lower arrays of heat exchanger tubes 21, and for a relationship between the guide plate 22A, 22B and upper and lower heat exchanger tubes 21.

In view of improvement in heat exchange efficiency, what is important for the heat exchanger tubes 21 is that an equal amount of liquid D evenly flows down onto every heat exchanger tube 21. For this reason, it is necessary to avoid a phenomenon in which the liquid D flows down from one heat exchanger tube 21 in an upper array onto two heat exchange tubes 21 in the lower array, or reversely the liquid D from two heat exchanger tubes 21 in the upper array flows down together onto one heat exchanger tube 21 in the lower array.

To this end, it is important to build a configuration in which upper and lower heat exchanger tubes 21 where the liquid D flows down have such one-to-one correspondence that the liquid D always flows down onto the same heat exchanger tubes 21 even when a ship or the like equipped with the falling film heat exchanger inclines sideways (heels) and swings sideways (rolls) in the right-and-left direction. This can be achieved in a way that the following guide plate 22A, 22B having an appropriate level of transmission properties to the liquid D is arranged between the upper and lower arrays of the heat exchanger tubes 21.

Figure 5:
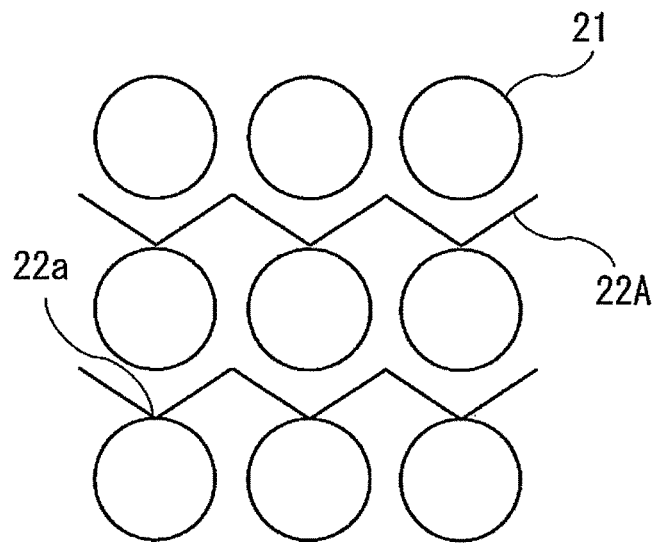
FIG. 5 is a view illustrating a schematic configuration of guide plates and heat exchanger tubes in a non-staggered arrangement.
Figure 6:
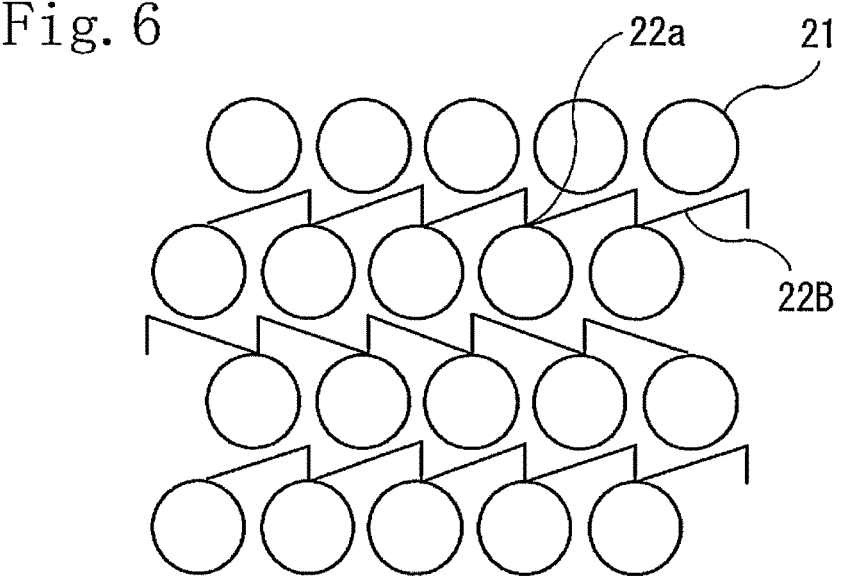
FIG. 6 is a view illustrating a schematic configuration of guide plates and heat exchanger tubes in a staggered arrangement.

The heat exchanger tubes 21 are each arranged substantially horizontally and form an array in the same horizontal plane. Then, the arrays of heat exchanger tubes 21 in the horizontal planes are stacked on top of another in the vertical direction as illustrated in FIGS. 3 and 4. Then, as illustrated in FIGS. 5 and 6, a plurality of heat exchanger tubes 21 are arranged in arrays spaced in the vertical direction, and a guide plate 22A, 22B having depressed portions 22a is arranged between an array of heat exchanger tubes 21 arranged side by side in the horizontal direction and the next lower array of heat exchanger tubes 21 arranged side by side in the horizontal direction. More specifically, the guide plate 22A, 22B is arranged such that the lowest parts of the depressed portions (valley portions) 22a are disposed near the respective crest portions of the lower heat exchanger tubes 21. FIG. 5 illustrates a case where the heat exchanger tubes 21 are arrayed in a non-staggered arrangement, and FIG. 6 illustrates a case where the heat exchanger tubes 21 are arrayed in a staggered arrangement.

Moreover, the lowest part of each depressed portion 22a in the guide plate 22A, 22B is provided with flow-down holes 22b for allowing liquid droplets to flow down onto the crest of the corresponding heat exchanger tube 21. The guide plate 22A, 22B is configured such that the liquid D flowing down from the surfaces of the upper heat exchanger tubes 21 can be conveyed to the heat exchanger tubes 21 in the lower array having one-to-one correspondences to the heat exchanger tubes 21 in the upper array even under a condition in which an inclination (sideways inclination (heel)+sideways swing (roll)) occurs at an inclination angle β within a predetermined angle range βa set in advance in a plane perpendicular to the tube axes of the heat exchanger tubes 21.

Figure 7:
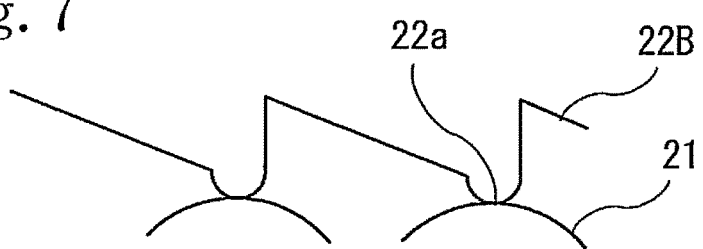
FIG. 7 is an enlarged view of depressed portions of a guide plate in FIG. 6.

In order to make the upper and lower heat exchanger tubes 21 correspond to each other on the one-to-one basis, the guide plate 22A may be formed of a symmetrically-shaped corrugated plate or folded plate as illustrated in FIG. 6, in the case where the upper and lower arrays of heat exchanger tubes 21 are aligned with each other when viewed in the vertical direction. Instead, in the case of the staggered arrangement, the upper and lower heat exchanger tubes 21 can be made to correspond to each other on the one-to-one basis by using the guide plate 22A formed of an asymmetrically-shaped corrugated plate or folded plate as illustrated in FIG. 7. In the case of the staggered arrangement, in particular, the plate material of each of the tube sheets (tube plates) 23, 24 illustrated in FIG. 3 can have a larger width for supporting a surface surrounded by the heat exchanger tubes 21 (a distance between the heat exchanger tubes 21) than in the case of the non-staggered arrangement, and thus the strength of the tube sheets (tube plates) 23, 24, for example, the anti-slosh properties for the liquid D can be enhanced.

In addition, the guide plate 22A, 22B is arranged with the depressed portions 22a of the guide plate 22A, 22B being in contact with the crest portions of the lower heat exchanger tubes 21, so that the liquid D can surely flow down from the upper heat exchanger tubes 21 to the lower heat exchanger tubes 21; the entire surfaces of the lower heat exchanger tubes 21 can be covered with the liquid films in the cross sectional plane; and the guide plate 22A, 22B can function as a heat dissipater or absorber fin provided to the heat exchanger tubes 21 by causing heat exchange between the guide plate 22A, 22B and the heat exchanger tubes 21. If the guide plate 22A, 22B and the heat exchanger tubes 21 are made of different kinds of metals, and therefore corrosion due to a potential difference needs to be prevented, an insulating heat dissipater sheet made of, for example, a silicon material filled with a ceramic filler or any other material may be inserted between the guide plate 22A, 22B and the heat exchanger tubes 21.

In this guide plate 22A, 22B, the flow-down holes 22b may be opened only near the depressed portions 22a or over the entire plate. In the case where the flow-down holes 22b are opened over the entire plate, the guide plate 22A, 22B needs to have the flow-down holes 22b opened with a diameter smaller than a droplet diameter D or needs to be a louvered sheet providing a sufficiently poor line-of-sight when viewed from the upper heat exchanger tubes 21, in order not to allow the liquid D dropped from the upper heat exchanger tubes 21 to pass through the guide plate 22A, 22B with an inclination.

In the case where the heat exchanger tubes 21 are used to generate or absorb a gas at their surfaces, the guide plate 22A, 22B preferably has sufficient gas permeability secured so as not to block the passage of the gas. In addition, since the generation and absorption processes of the gas proceed not only on the surfaces of the heat exchanger tubes 21 but also on the surface of the guide plate 22A, 22B, the guide plate 22A, 22B and the heat exchanger tubes 21 immediately below the guide plate 22A, 22B are arranged in contact with each other so as to exchange heat therebetween.

Moreover, if a long residence time of the liquid D dropping from above needs to be secured, the guide plate 22A, 22B and the heat exchanger tube 21 immediately above the guide plate 22A, 22B are spaced at an interval larger than a droplet diameter level because the liquid D is desired to drop from the heat exchanger tubes 21 onto the guide plate 22A, 22B below them without flowing down due to the surface tension or the capillary attraction.

Figure 8:
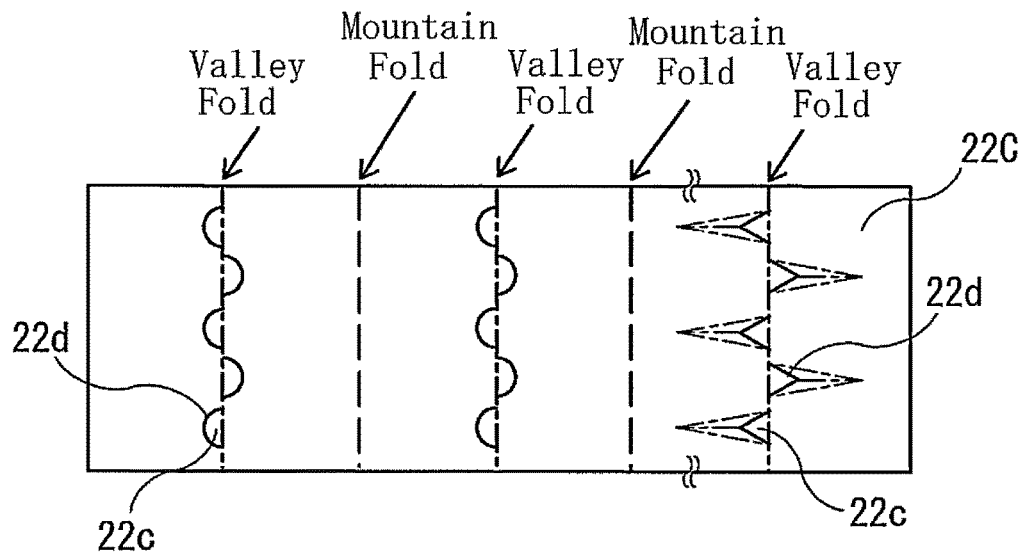
FIG. 8 is a plan view illustrating a plate material in the process of manufacturing a guide plate.

In addition, as illustrated in FIG. 8, the lowest part of each of the depressed portions 22a of the guide plate 22A, 22B is formed in such a left-right symmetrical shape that, in the cross sectional plane, the liquid D can flow down evenly on the right and the left of the crest portion of each lower heat exchanger tube and can cover the entire surface of the lower heat exchanger tube with its liquid film.

This guide plate 22A, 22B can be formed by using any plate material selected from a mesh sheet, a grating, a grid, and a louvered sheet in which small holes are opened with a diameter smaller than the natural droplet diameter of the liquid D to be dropped, and by corrugating or folding the plate material.

Figure 9:
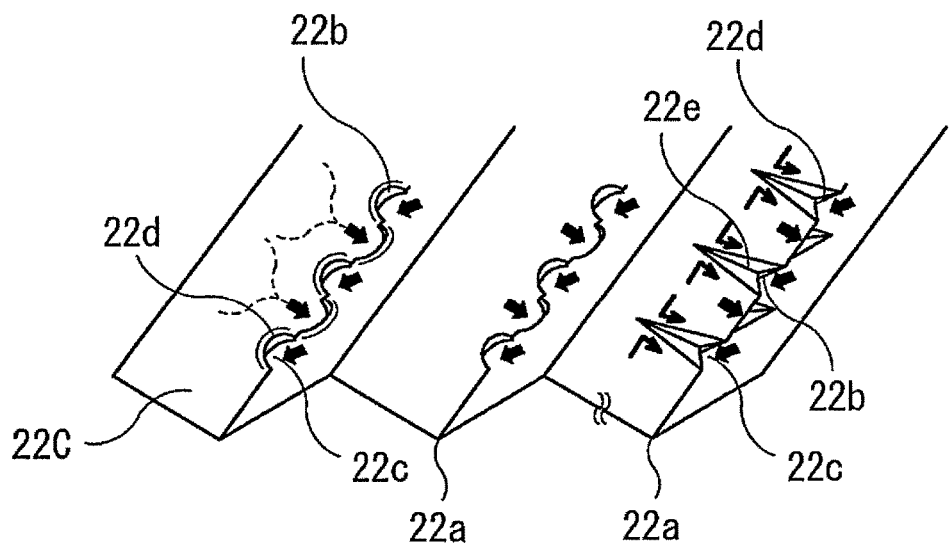
FIG. 9 is a perspective view illustrating the plate material for the guide plate in FIG. 8 in a folded state.

In addition, as illustrated in FIG. 8, the flow-down holes 22b are formed in the right and left sides of the lowest part of the depressed portion 22a by making cuts in any shape selected from a half circle, a U shape, a V shape, a block-U shape, a nail shape, and a nail shape with crack tip, which has both end points located on almost the center line of the lowest part, and then by making a valley fold at the lowest part. More specifically, a plate material is set to be folded alternately by mountain folds and valley folds to be a corrugated plate or a folded plate. A guide plate 22C as illustrated in FIG. 9 is formed by making cuts 22d in a half circle shape, a U shape, a V shape, a block-U shape, a nail shape, a nail shape with crack tip or the like in the valley fold parts, and by causing protrusions (nail portions or tongue portions) 22c to jut out from the valley fold parts when the valley folds are made. As a result, some of the protrusions 22c form slopes in which an inclined surface to the left of the valley fold part extends to the right of the valley fold part and the other some protrusions 22c form slopes in which an inclined surface to the right of the valley fold part extends to the left of the valley fold part. Here, the cuts 22d for forming the protrusions 22c are made by press shearing, and are formed such that "burrs (flashes)" generated by the shearing are left sticking out on the upper surface of the guide plate 22C (the inside of the valley portion).

Note that this "burr" is a fine rough edge generated on a cut surface of a thin metal plate when the plate is cut by scissors, for example, and is also called a flash. Moreover, in a plan view in FIG. 8, fine punch holes (not illustrated) are preferably opened, and also in this case, are formed such that their burrs generated by the punching are left sticking out on the upper surface of the guide plate 22C.

Figure 11:
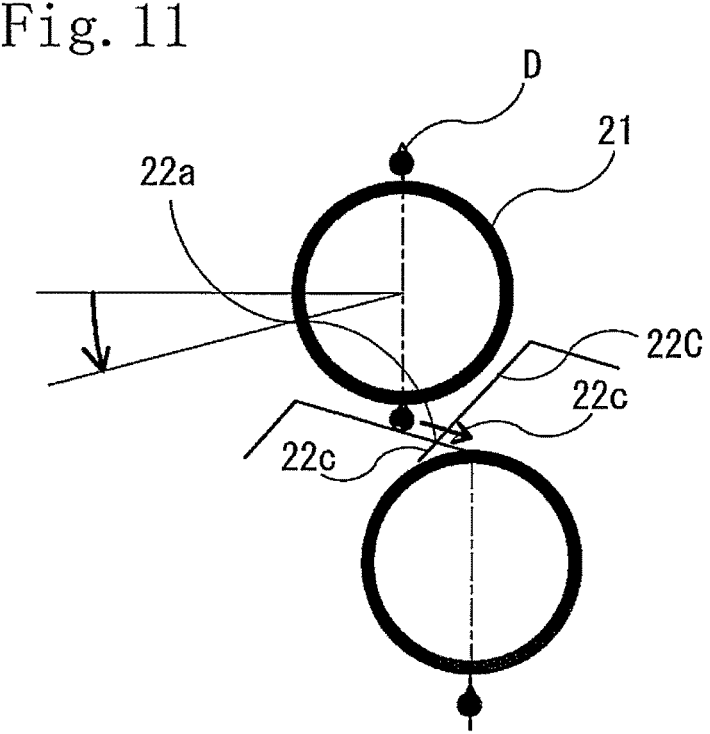
FIG. 11 is a view illustrating a positional relationship between the protrusions of the guide plate and the heat exchanger tubes in FIG. 10 in a case where an inclination occurs.

The liquid droplets D flowing down from the heat exchanger tubes 21 in the upper array are received on the mountain fold parts of the guide plate 22C and are guided to the depressed portions 22a of the valley fold parts by an inclination of the inclined surface, wetting or capillary attraction. In this event, the liquid D dropped on the left inclined surface because of a leftward inclination around the tube axis of the heat exchanger tube 21, for example, is blocked around the flow-down holes 22b by the "burrs" sticking out on the upper surface of the guide plate 22C, thereby flows down around the flow-down holes 22b while being guided to the protrusions 22c, and then flows on the slopes of the protrusions 22c down to the slightly right of the valley fold, where the liquid D is dropped and moved to the heat exchanger tube 21 in the lower array. In the same manner, the liquid D dropped on the right inclined surface is guided around the "burrs" down to the slightly left of the valley folds, where the liquid D is dropped and moved to the heat exchanger tube 21 in the lower array. This produces an effect of causing the liquid to flow down around a position in the plumb line of the heat exchanger tube 21 immediately below, as illustrated in FIG. 11, even in the case where an inclination around the tube axis of the heat exchanger tube 21 occurs. It should be noted that it is preferable to prevent the dropped liquid D from passing through the guide plate 22C to the back surface (lower surface) thereof until the liquid D reaches the protrusions 22c near the valley folds. For this purpose, it is preferable that the "burrs" of the punch holes (not illustrated) in the flat surface portion stick out on the upper surface.

Figure 10:
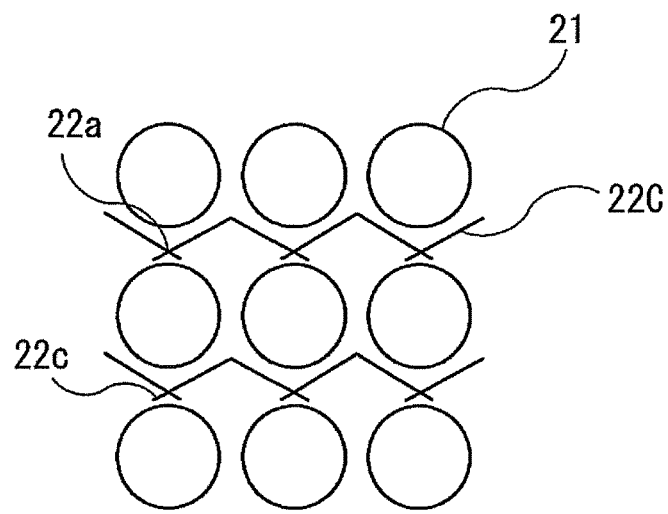
FIG. 10 is a view illustrating a positional relationship between protrusions of the guide plate in FIG. 9 and heat exchanger tubes in a case where no inclination occurs.

In this method, as illustrated in FIG. 11, both the right and left sides of the outer surface of the heat exchanger tube 21 in the lower array are expected to be utilized more surely even when an inclination occurs more or less. Moreover, as illustrated in FIG. 10, when the protrusions 22 of the guide plate 22C are in contact with the heat exchanger tubes 21 in the lower array, the guide plate 22C stably stays on the heat exchanger tubes 21 in the lower array, and also makes heat transfer through heat conduction by utilizing the increased contact area. Thus, heat transfer is surely made from the guide plate 22C to the heat exchanger tubes 21.

In addition, the right sides of FIGS. 8 and 9 illustrate an example where the plate material 22C is protruded by processing to have ridges 22e orthogonal to the valley line. Specifically, the plate material 22C is provided with V-shaped cuts 22d and the ridges 22e of mountain folds for the purposes of more actively guiding the liquid D to the protrusions 22c, and for preventing the liquid movement in a direction parallel to the valley line, in other words, preventing the liquid D from moving along the valley line, when an inclination occurs.

Figure 12:
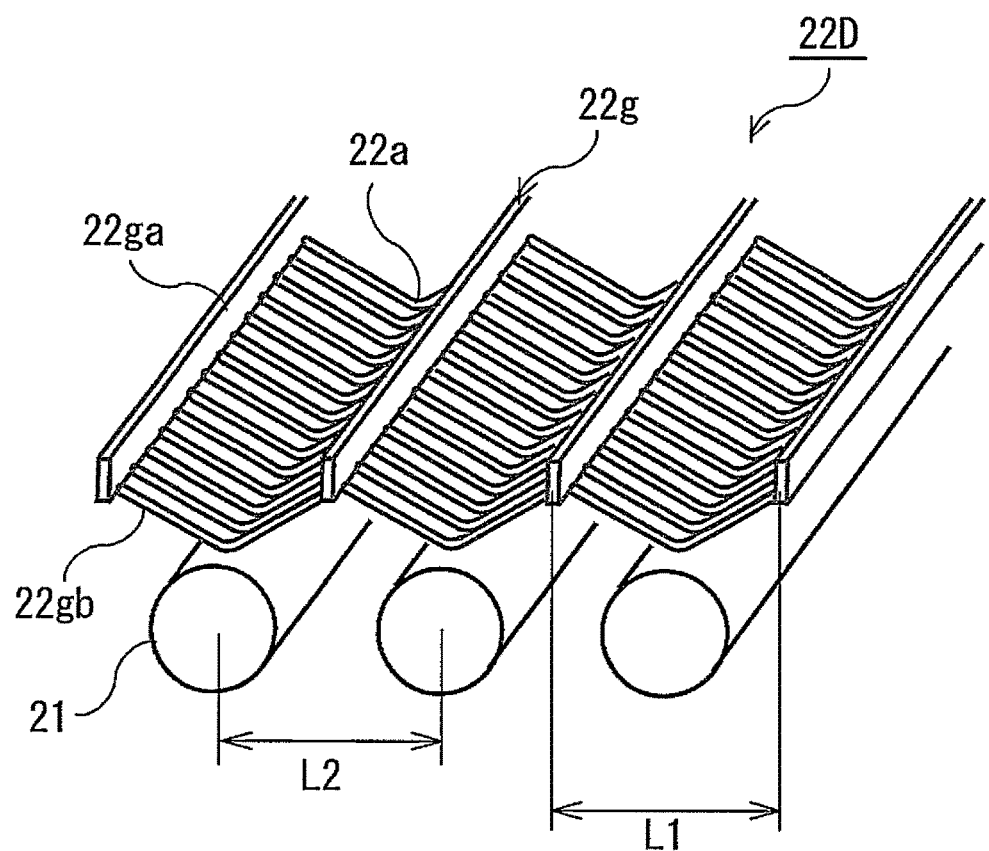
FIG. 12 is a perspective view illustrating a relationship between heat exchanger tubes and a guide plate in a case where the guide plate is formed of a grating.
Figure 13:
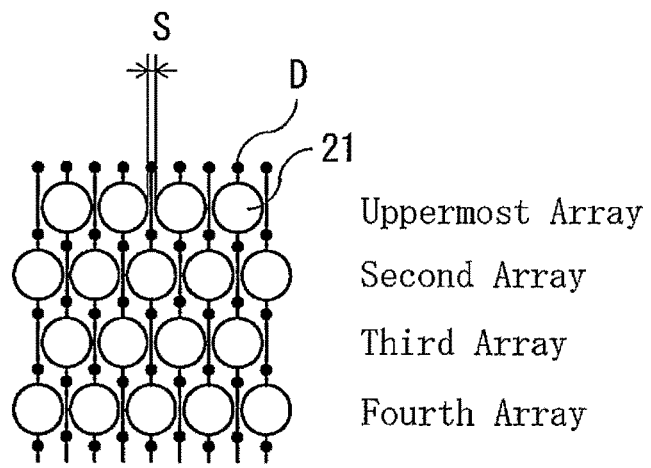
FIG. 13 is a view for explaining a bypass problem of a bank of heat exchanger tubes in a staggered arrangement in a falling film heat exchanger.
Figure 14:
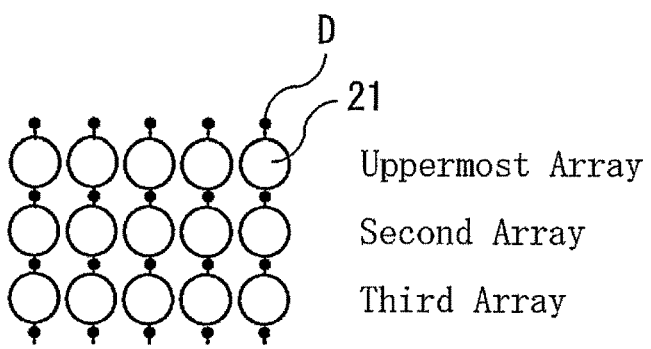
FIG. 14 is a view for explaining the bypass problem of a bank of heat exchanger tubes in a non-staggered arrangement in a falling film heat exchanger in the case where no inclination occurs.
Figure 15:
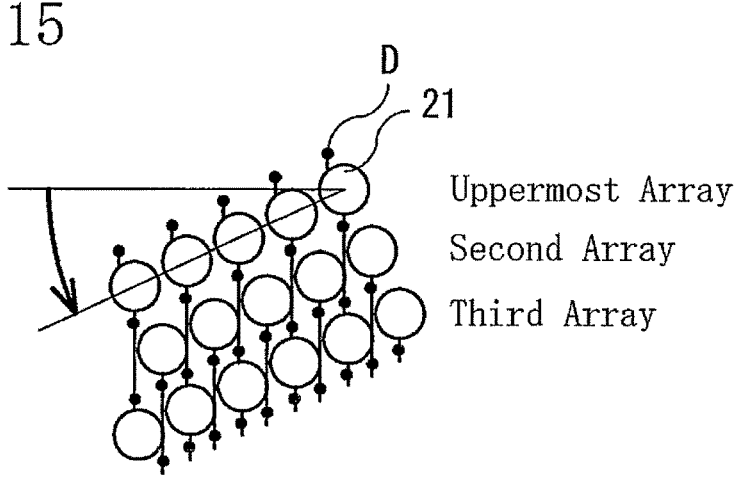
FIG. 15 is a view for explaining the bypass problem of a bank of heat exchanger tubes in a staggered arrangement in a falling film heat exchanger in the case where an inclination occurs.
Figure 16:
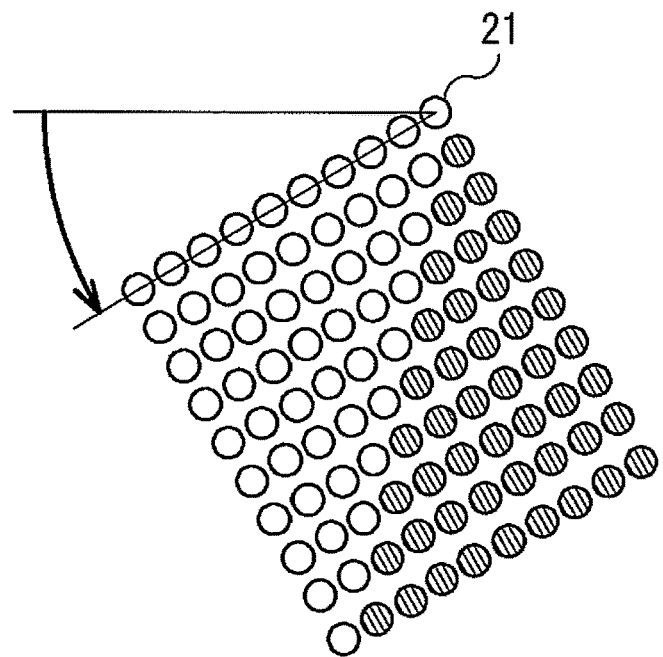
FIG. 16 is a view for explaining a no-flow region increase problem of a bank of heat exchanger tubes in a non-staggered arrangement in a falling film heat exchanger in the case where an inclination occurs.
Figure 17:
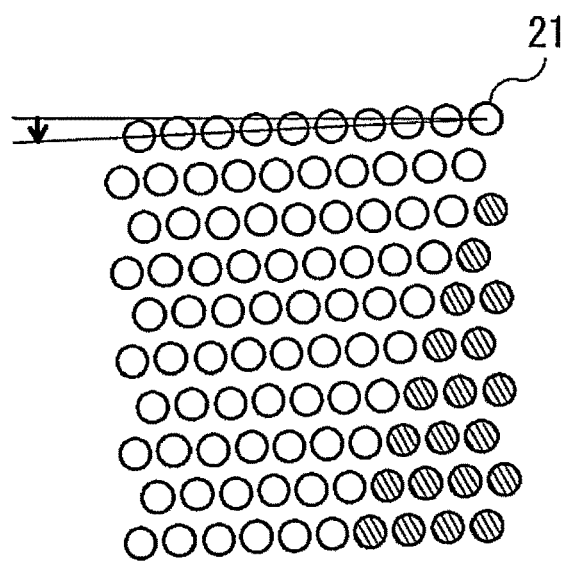
FIG. 17 is a view for explaining the no-flow region increase problem of a bank of heat exchanger tubes in a staggered arrangement in a falling film heat exchanger in the case where an inclination occurs.
Figure 18:
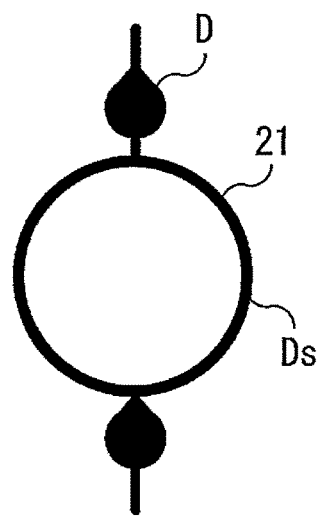
FIG. 18 is a view for explaining a wet surface reduction problem of a heat exchanger tube in a falling film heat exchanger in the case where a liquid is dropped onto a crest.
Figure 19:
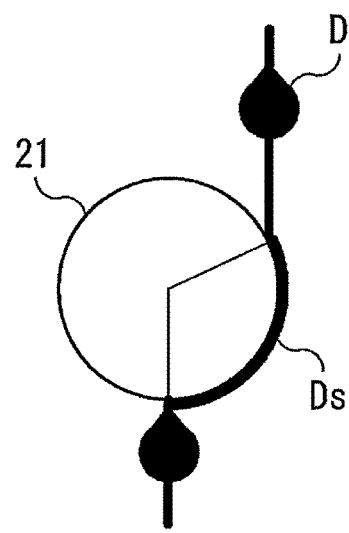
FIG. 19 is a view for explaining the wet surface reduction problem of the heat exchanger tube in the falling film heat exchanger in the case where a liquid is dropped onto a place off the crest.

In addition, as illustrated in FIG. 12, in the case where a guide plate 22D is formed by using a grating 22g in which metal materials are interlocked in a lattice form, a grating may be used in which flat bars 22ga are arranged parallel to each other and rod members 22gb are arranged between and joined to portions near the base sides of the flat bars 22ga. In this case, the guide plate 22D can be formed by press working to corrugate the grating 22g in such a wave form that an interval L1 between the flat bars 22ga in the grating 22g in the folded state can be equal to an interval L2 between the heat exchanger tubes 21. Incidentally, the interval L1 between the flat bars 22ga in the grating 22g in the folded state may be set to half of the lateral interval L2 between the heat exchanger tubes 21 and alternate ones of the flat bars 22ga, which come to the lower side, may be arranged on top of the crest portions of the heat exchanger tubes 21.

According to the falling film heat exchanger 20, the absorption refrigerator system 30, and the ship, the offshore structure and the underwater offshore structure described above, the liquid distributor 10 in the falling film heat exchanger 20 distributes a liquid D such as a coolant or an absorber evenly, and drops the liquid D onto the crests of the heat exchanger tubes 21, even when the ship or the like inclines or swings. Thus, the liquid D dropped from the heat exchanger tubes 21 located in the upper array can surely fall onto the surfaces of the heat exchanger tubes 21 located in the lower array, which makes it possible to avoid deterioration of heat exchange efficiency.

With the configuration of the liquid distributor 10, in particular, the liquid D can be evenly distributed over the tray 15 and dropped onto the heat exchanger tubes 21. In addition, the liquid D can be distributed over a wide horizontal plane. Moreover, even under an inclination at 45 degrees in the longitudinal direction of the heat exchanger tubes 21, the liquid D can be continuously supplied to the heat exchanger tubes 21. Consequently, the falling film heat exchanger 20 can be installed on a ship, an offshore structure and an underwater offshore structure.

Further, by the arrangement of the guide plate 22A, 22B, 22G having portions depressed from the upper side, the liquid D flowing down on the outer surfaces of the respective upper heat exchanger tubes 21 are conveyed onto the lower heat exchanger tubes 21 having the one-to-one correspondences to the upper heat exchanger tubes 21 even if there occurs an inclination within a predetermined angle range set in advance in a plane perpendicular to the tube axes of the heat exchanger tubes 21. Thus, the liquid D can be surely dropped onto the crests of the heat exchanger tubes 21 in the next lower array.

Moreover, even in a heat exchanger tube bank arrangement where a larger number of heat exchanger tubes are arrayed in the vertical direction than in the lateral direction, performance deterioration due to an inclination in the plane perpendicular to the tube axes can be avoided and thus an effect of reducing the layout area necessary for installation can be produced. Further, such heat exchanger tube bank arrangement also produces an effect of allowing employment of simple distribution in the lateral direction in the liquid distributor 10.

Still further, in the case where the first distribution passages 13 and the second distribution passages 14A, 14B are provided with a downslope, the disposition of the distribution tank 11 around the center of the heat exchanger tubes 21 in the longitudinal direction makes it possible to minimize the length of the downslope and thus to keep the height of the whole apparatus low. Furthermore, the configuration including the dischargers 12 formed of stub pipes with the same shape equalizes the fluid resistance in discharging, so that the amounts of liquid D discharged from the outlets of the stub pipes can be easily equalized to each other.

Then, an absorption refrigeration system 30 of an embodiment according to the present invention includes the above falling film heat exchanger 20, and thereby can produce the similar or same effects as those of the above falling film heat exchanger 20.

In addition, a ship of an embodiment according to the present invention is equipped with the above falling film heat exchanger 20 or the above absorption refrigeration system 10 such that the longitudinal direction of the distribution area of the heat exchanger tubes or instead, if the area is square, the direction of one side of the square is aligned with the ship longitudinal direction (the fore-and-aft direction of the hull, i.e., roll axis direction). With this configuration, the ship can produce the similar or same effects as those of the above falling film heat exchanger 20.

Furthermore, an offshore structure and an underwater offshore structure of embodiments according to the present invention are equipped with the above falling film heat exchanger 20 or the above absorption refrigeration system 10, and thereby can produce the similar or same effects as those of the above falling film heat exchanger 20. Here, if the offshore structure or the underwater offshore structure has a ship-like shape, preferable installation is such that the longitudinal direction of the distribution area of the heat exchanger tubes or instead, if the area is square, the direction of one side of the square is aligned with the ship longitudinal direction.

INDUSTRIAL APPLICABILITY

According to a falling film heat exchanger, an absorption refrigerator system as well as a ship, an offshore structure and an underwater offshore structure of the present invention, even when the ship or the like inclines and swings, the guide plates in the falling film heat exchanger surely drop a liquid onto the crests of heat exchanger tubes, thereby enable the liquid dropped from the heat exchanger tubes located in the upper array to surely fall on the surfaces of the heat exchanger tubes located in the lower array, and hence can avoid the reduction in heat exchange performance. Thus, the invention is applicable to all types of falling film heat exchangers, is widely usable in an absorber, an evaporator, a distiller, a concentrator, and an absorption refrigeration system each using a falling film heat exchanger, and is also broadly usable in a ship, an offshore structure and an underwater offshore structure.

EXPLANATION OF REFERENCE NUMERALS 10 liquid distributor
11 distribution tank
12 discharger
13 first distribution passage 14A, 14B second distribution passage
14a partition plate
14b distribution hole
15 tray
20 falling film heat exchanger
20A evaporator
20B absorber
21 heat exchanger tube
22A, 22B, 22C, 22D guide plate
22a depressed portion (valley portion)
22b flow-down hole
22c protrusion (nail portion, tongue portion)
22d cut
22e ridge
22g grating
22ga flat bar
22gb rod member
23, 24 tube plate
25 partition plate
26, 26A, 26B bottom portion
27A, 27B liquid reservoir
28 parapet
29 coolant-absorber separation louver
30 absorption refrigeration system
D, Da, Db liquid (liquid droplet)

The invention claimed is:

1. A falling film heat exchanger for use in an environment resulting in swinging motions and comprising:
a bottom section in which liquid is collected,
a plurality of substantially horizontally extending arrays of heat exchanger tubes, the arrays being spaced in a vertical direction to define a plurality of adjacent pairs of arrays, and the heat exchanger tubes in each array having lengthwise axes and being arranged side by side in a horizontal direction, a plurality of guide plates, one guide plate of the plurality of guide plates being provided between each adjacent pair of arrays, each guide plate having depressed portions, the guide plates being respectively provided between one of the plurality of arrays of heat exchanger tubes arranged side by side in a horizontal direction and a next lower one of the plurality of arrays of heat exchanger tubes arranged side by side in the horizontal direction, and being positioned with lowest parts of the depressed portions disposed near crest portions of the respective lower heat exchanger tubes, and
partition plates provided in the bottom section of the heat exchanger below the heat exchanger tubes, and the partition plates being spaced from each other and dividing the bottom section of the heat exchanger in a direction of the lengthwise axes of the heat exchanger tubes to define liquid reservoirs between the partition plates to collect liquid in the bottom section, the each of the bottom portions between the partition plates is inclined in the direction of the lengthwise axes of the heat exchanger tubes
wherein the lowest parts of the depressed portions of the guide plates are provided with flow-down holes for allowing liquid droplets to flow down onto the crests of the heat exchanger tubes, and thereby
the guide plates are configured to convey the liquid flowing down on outer surfaces of the respective upper heat exchanger tubes onto the lower heat exchanger tubes having one-to-one correspondences to the upper heat exchanger tubes even when an inclination within a predetermined angle range set in advance occurs in a plane perpendicular to tube axes of the heat exchanger tubes.

2. The falling film heat exchanger according to claim 1, wherein each of the guide plates is provided with a louver or a relief structure having a ridge substantially perpendicular to a valley line of each of the depressed portions of each of the guide plates in the depressed portion of the valley line so as to prevent the dropped liquid from moving, over the guide plates, along the valley lines of the depressed portions of the guide plates.

3. The falling film heat exchanger according to claim 1, wherein the flow-down holes are formed in right and left sides of the lowest part of each of the depressed portions as cuts in any shape selected from a half circle, a U shape, a V shape, and a block-U shape, each of which has both end points located on the center line of the lowest part, and each of the guide plates has a valley fold at the lowest part and protrusions formed by the cuts jutting downward from the depressed portion.

4. The falling film heat exchanger according to claim 1, wherein the depressed portions of each of the guide plates are in contact with the crest portions of the respective lower heat exchanger tubes.

5. An absorption refrigeration system wherein
the system comprises the falling film heat exchanger according to claim 1.

6. A ship wherein
the ship is equipped with the falling film heat exchanger according to claim 1.

7. An offshore structure wherein
the offshore structure is equipped with the falling film heat exchanger according to claim 1.

8. An underwater offshore structure wherein
the underwater offshore structure is equipped with the falling film heat exchanger according to claim 1.

9. The absorption refrigeration system according to claim 5, wherein:
the falling film heat exchanger has an evaporator and an absorber integrally provided therein,
a bottom portion of the evaporator and a bottom portion of the absorber each have a liquid reservoir provided therein,
the evaporator and the absorber each have parapets,
the liquid reservoir is provided in the bottom portion of the evaporator and the absorber, and
an upper border portion between the evaporator and the absorber is provided with a coolant-absorber separation louver therein.

10. The ship according to claim 6, wherein the heat exchanger tubes of the falling film heat exchanger have an axial direction aligned with the longitudinal direction of the ship.

11. The offshore structure according to claim 7, wherein the heat exchanger tubes of the falling film heat exchanger have an axial direction aligned with the longitudinal direction of the offshore structure.

12. The underwater offshore structure according to claim 8, wherein the heat exchanger tubes of the falling film heat exchanger have an axial direction aligned with the longitudinal direction of the underwater offshore structure.

13. A falling film heat exchanger for use in an environment resulting in swinging motions and comprising:
a bottom section in which liquid is collected,
a plurality of substantially horizontally extending arrays of heat exchanger tubes, the arrays being spaced in a vertical direction to define a plurality of adjacent pairs of arrays, and the heat exchanger tubes in each array having lengthwise axes and being arranged side by side in a horizontal direction, a plurality of guide plates, one guide plate of the plurality of guide plates being provided between each adjacent pair of arrays, each guide plate having depressed portions, the guide plates being respectively provided between one of the plurality of arrays of heat exchanger tubes arranged side by side in a horizontal direction and a next lower one of the plurality of arrays of heat exchanger tubes arranged side by side in the horizontal direction, and being positioned with lowest parts of the depressed portions disposed near crest portions of the respective lower heat exchanger tubes, and means for dividing the bottom section of the heat exchanger into a plurality of liquid reservoirs for collecting liquid in the bottom section without sloshing of the collected liquid between the liquid reservoirs when swinging motions take place, an inclined bottom portion is provided with each of the divided bottom sections, wherein the lowest parts of the depressed portions of the guide plates are provided with flow-down holes for allowing liquid droplets to flow down onto the crests of the heat exchanger tubes, and thereby the guide plates are configured to convey the liquid flowing down on outer surfaces of the respective upper heat exchanger tubes onto the lower heat exchanger tubes having one-to-one correspondences to the upper heat exchanger tubes even when an inclination within a predetermined angle range set in advance occurs in a plane perpendicular to tube axes of the heat exchanger tubes.

* * * * *